US009280025B2

(12) United States Patent
Nakahara et al.

(10) Patent No.: US 9,280,025 B2
(45) Date of Patent: Mar. 8, 2016

(54) ACTIVE MATRIX SUBSTRATE AND DISPLAY DEVICE

(75) Inventors: Hijiri Nakahara, Osaka (JP); Yukihiro Hotta, Osaka (JP); Kohichi Tanijiri, Osaka (JP); Junichi Morinaga, Osaka (JP)

(73) Assignee: UNIFIED INNOVATIVE TECHNOLOGY, LLC, Wilmington, DE (US)

( * ) Notice: Subject to any disclaimer, the term of this patent is extended or adjusted under 35 U.S.C. 154(b) by 912 days.

(21) Appl. No.: 13/147,830

(22) PCT Filed: Nov. 13, 2009

(86) PCT No.: PCT/JP2009/069389
§ 371 (c)(1),
(2), (4) Date: Aug. 4, 2011

(87) PCT Pub. No.: WO2010/106710
PCT Pub. Date: Sep. 23, 2010

(65) Prior Publication Data
US 2011/0291126 A1    Dec. 1, 2011

(30) Foreign Application Priority Data
Mar. 18, 2009    (JP) ................. 2009-066010

(51) Int. Cl.
*H01L 29/04*    (2006.01)
*G02F 1/1362*    (2006.01)

(52) U.S. Cl.
CPC ...... *G02F 1/136213* (2013.01); *G02F 2201/40* (2013.01)

(58) Field of Classification Search
CPC .......... G02F 1/136213; G02F 2201/40; H01L 27/1255; H01L 29/78633
USPC .............................. 257/59, 72, 88
See application file for complete search history.

(56) References Cited

U.S. PATENT DOCUMENTS 5,283,566 A    2/1994    Mimura et al.
7,940,344 B2    5/2011    Uemoto
(Continued)

FOREIGN PATENT DOCUMENTS

CN    1875325 A    12/2006
CN    1885114 A    12/2006
(Continued)

OTHER PUBLICATIONS

Official Communication issued in International Patent Application No. PCT/JP2009/069389, mailed on Dec. 15, 2009.

*Primary Examiner* — Hung Vu
(74) *Attorney, Agent, or Firm* — Birch, Stewart, Kolasch & Birch, LLP

(57) ABSTRACT

An active matrix substrate (5) is provided with: a plurality of source wiring lines (S) and a plurality of gate wiring lines (G) which are arranged in a matrix; and pixels (P) having thin film transistors (25) disposed in the vicinity of the intersections of the source wiring lines (S) and the gate wiring lines (G), and pixel electrodes (26) connected to the thin film transistors (25). In the active matrix substrate (5), a base material (5a) is disposed in such a manner that the source wiring lines (S) and the gate wiring lines (G) intersect each other, and on the base material (5a), auxiliary capacity electrodes (28), which are provided on the pixel basis, are made of transparent electrodes, and generate an auxiliary capacity, and auxiliary capacity wiring lines (29), which are connected to the auxiliary capacity electrodes (28) and are made of an aluminum alloy, are provided.

12 Claims, 13 Drawing Sheets

(56) References Cited

U.S. PATENT DOCUMENTS

| | | |
|---|---|---|
| 2001/0030717 A1* | 10/2001 | Kaneko et al. .................. 349/43 |
| 2004/0022664 A1 | 2/2004 | Kubota et al. |
| 2005/0030450 A1 | 2/2005 | Okamoto et al. |
| 2006/0187392 A1 | 8/2006 | Okamoto et al. |
| 2007/0060490 A1 | 3/2007 | Skee |
| 2007/0081106 A1 | 4/2007 | Cho et al. |
| 2007/0263131 A1* | 11/2007 | Uemoto .......................... 349/39 |

FOREIGN PATENT DOCUMENTS

| | | |
|---|---|---|
| CN | 101071239 A | 11/2007 |
| JP | 01-255831 A | 10/1989 |
| JP | 05-080352 A | 4/1993 |
| JP | 2003-089864 A | 3/2003 |
| JP | 2004-046223 A | 2/2004 |
| JP | 2006-195098 A | 7/2006 |
| JP | 2007-304602 A | 11/2007 |

* cited by examiner

ACTIVE MATRIX SUBSTRATE AND DISPLAY DEVICE

TECHNICAL FIELD

The present invention relates to an active matrix substrate in which a plurality of data wiring lines and a plurality of scanning wiring lines are arranged in a matrix, and a display device using the active matrix substrate.

BACKGROUND ART

In recent years, for example, liquid crystal display devices are used widely for liquid crystal TVs, monitors, mobile telephones, etc. as flat panel displays having features such as thinness and light weight, compared with conventional Braun tubes. In such a liquid crystal display device, it is known that an active matrix substrate, which is provided with a plurality of data wiring lines (source wiring lines) and a plurality of scanning wiring lines (gate wiring lines) arranged in a matrix, and pixels arranged in a matrix, each having a switching element such as a thin film transistor (TFT) disposed in the vicinity of the intersection of the data wiring line and the scanning wiring line and a pixel electrode connected to the switching element, is used for a liquid crystal panel as a display panel.

Further, in such an active matrix substrate, in order to enhance the display quality in the liquid crystal display device, there is a demand that a sufficient auxiliary capacity be added to the pixel electrodes and the opening ratio of the pixels be increased.

Further, in the conventional active matrix substrate, for example, as described in the following Patent document 1, it is proposed that first and second transparent conductive patterns be provided so as to sandwich a gate insulating film, and an auxiliary capacity be generated between the first and second transparent conductive patterns. Further, in the conventional active matrix substrate, an auxiliary capacity line (auxiliary capacity wiring line) is connected to the second transparent electrode pattern, and an end of the first transparent electrode pattern is directly laminated on a source electrode of the thin film transistor without providing a contact hole. Further, in the conventional active matrix substrate, a contact hole for bringing the pixel electrode and the first transparent electrode pattern into conduction is provided at a portion where the second transparent electrode pattern and the auxiliary capacity line overlap each other, and an island-shaped pattern including a semiconductor layer is provided on the gate insulating film. Then, the conventional active matrix substrate enables a sufficient auxiliary capacity to be ensured and the opening ratio of the pixels to be increased.

PRIOR ART DOCUMENTS

Patent Document

Patent document 1: JP 2006-195098 A

DISCLOSURE OF INVENTION

Problem to be Solved by the Invention

However, in the above-mentioned conventional active matrix substrate, it is difficult to reduce power consumption and to narrow down a frame and increase an opening ratio.

Specifically, in the conventional active matrix substrate, a molybdenum-tungsten alloy film is used for the auxiliary capacity line (auxiliary capacity wiring line). The molybdenum-tungsten alloy film has a high sheet resistance of 0.6 to 1.0 $\Omega$/sq. Therefore, in the conventional active matrix substrate, it is difficult to decrease electric power for generating an auxiliary capacity. Further, in the conventional active matrix substrate, it is requested that a voltage to be applied to the auxiliary capacity line be increased when the auxiliary capacity is generated. Consequently, in the conventional active matrix substrate, it is requested that the pitch size of two adjacent auxiliary capacity lines be increased, which makes it difficult to narrow down a frame, and the use of a high-resistant material increases the pitch size of auxiliary capacity lines, scanning wiring lines, and data wiring lines, which decreases the opening ratio of pixels.

In view of the above-mentioned problems, an object of the present invention is to provide an active matrix substrate in which power consumption can be reduced, and a frame can be narrowed down and an opening ratio can be increased, and a display device using the active matrix substrate.

Means for Solving Problem

In order to achieve the above-mentioned object, an active matrix substrate of the present invention is used as a substrate of a display panel and has a plurality of data wiring lines and a plurality of scanning wiring lines arranged in a matrix, and pixels having switching elements provided in a vicinity of intersections of the data wiring lines and the scanning wiring lines and pixel electrodes connected to the switching elements. The active matrix substrate includes: a base material provided in such a manner that the data wiring lines and the scanning wiring lines intersect each other, wherein, on the base material, auxiliary capacity electrodes, which are provided on the pixel basis, are made of transparent electrodes, and generate an auxiliary capacity, and auxiliary capacity wiring lines, which are connected to the auxiliary capacity electrodes and are made of an aluminum alloy, are provided.

In the active matrix substrate configured as described above, the auxiliary capacity electrodes made of transparent electrodes are provided, and the auxiliary capacity wiring lines made of an aluminum alloy are connected to the auxiliary capacity electrodes. Unlike the above-mentioned conventional example, the aluminum alloy has a low sheet resistance of 0.1 to 0.4 $\Omega$/sq., which can reduce power consumption, and a wiring line width can be reduced, narrowing down a frame and increasing an opening ratio.

Further, in the above-mentioned active matrix substrate, on the base material, the auxiliary capacity wiring lines may be provided on the auxiliary capacity electrodes to be connected thereto in connecting portions between the auxiliary capacity electrodes and the auxiliary capacity wiring lines.

In this case, the active matrix substrate with a simple configuration can be configured easily.

Further, in the above-mentioned active matrix substrate, a transparent conductive film may be used as the auxiliary capacity electrodes, and the auxiliary capacity wiring lines may contain, as an additive, at least one element of carbon, silicon, cobalt, nickel, germanium, rhodium, palladium, and tin.

In this case, the occurrence of galvanic corrosion can be suppressed with reliability between the auxiliary capacity electrodes and the auxiliary capacity wiring lines.

Further, in the above-mentioned active matrix substrate, it is preferred that a total % by weight of the additive be 0.6% to 5.0% in the auxiliary capacity wiring lines.

In this case, the occurrence of galvanic corrosion can be suppressed with more reliability between the auxiliary capacity electrodes and the auxiliary capacity wiring lines.

Further, in the active matrix substrate, the scanning wiring lines may be made of the aluminum alloy, and on the base material, the scanning wiring lines may be provided on the transparent electrodes.

In this case, the auxiliary capacity wiring lines and the scanning wiring lines can be formed simultaneously, and the production process of the active matrix substrate can be simplified easily.

Further, in the above-mentioned active matrix substrate, the scanning wiring lines may contain, as an additive, at least one element of carbon, silicon, cobalt, nickel, germanium, rhodium, palladium, and tin.

In this case, the occurrence of galvanic corrosion can be suppressed with reliability between the transparent electrodes and the scanning wiring lines.

Further, in the above-mentioned active matrix substrate, it is preferred that a total % by weight of the additive be 0.6% to 5.0% in the scanning wiring lines.

In this case, the occurrence of galvanic corrosion can be suppressed with more reliability between the transparent electrodes and the scanning wiring lines.

Further, in the active matrix substrate, on the base material, the auxiliary capacity electrodes may be provided on the auxiliary capacity wiring lines to be connected thereto in connecting portions between the auxiliary capacity electrodes and the auxiliary capacity wiring lines.

In this case, the number of kinds of the transparent electrodes constituting the auxiliary capacity electrodes can be increased.

Further, in the above-mentioned active matrix substrate, a transparent conductive film may be used as the auxiliary capacity electrodes, and the auxiliary capacity wiring lines may contain, as an additive, at least one element of carbon, silicon, cobalt, nickel, germanium, rhodium, palladium, and tin.

In this case, the occurrence of galvanic corrosion can be suppressed with reliability between the auxiliary capacity electrodes and the auxiliary capacity wiring line.

Further, in the above-mentioned active matrix substrate, it is preferred that a total % by weight of the additive be 0.3% to 5.0% in the auxiliary capacity wiring lines.

In this case, the occurrence of galvanic corrosion can be suppressed with more reliability between the auxiliary capacity electrodes and the auxiliary capacity wiring lines.

Further, the present invention relates to a display device including a display portion, wherein, in the display portion, the active matrix substrate according to any of the above descriptions is used.

In the display device configured as described above, an active matrix substrate, in which power consumption can be reduced and a wiring line width can be reduced to narrow down a frame and increase an opening, is used in a display portion. Therefore, a display device with low power consumption having a high-definition display portion can be configured easily.

Effects of the Invention

According to the present invention, an active matrix substrate in which power consumption can be reduced, and a frame can be narrowed down and an opening ratio can be increased, and a display device using the active matrix substrate can be provided.

DESCRIPTION OF THE INVENTION

Hereinafter, preferred embodiments of an active matrix substrate and a display device of the present invention will be described with reference to the drawings. In the following description, the case where the present invention is applied to a transmission type liquid crystal display device is exemplified. Further, the dimension of constituent members in each figure do not faithfully reflect the dimension of actual constituent members, the dimension ratio of the respective constituent members, etc.

Embodiment 1

Figure 1:
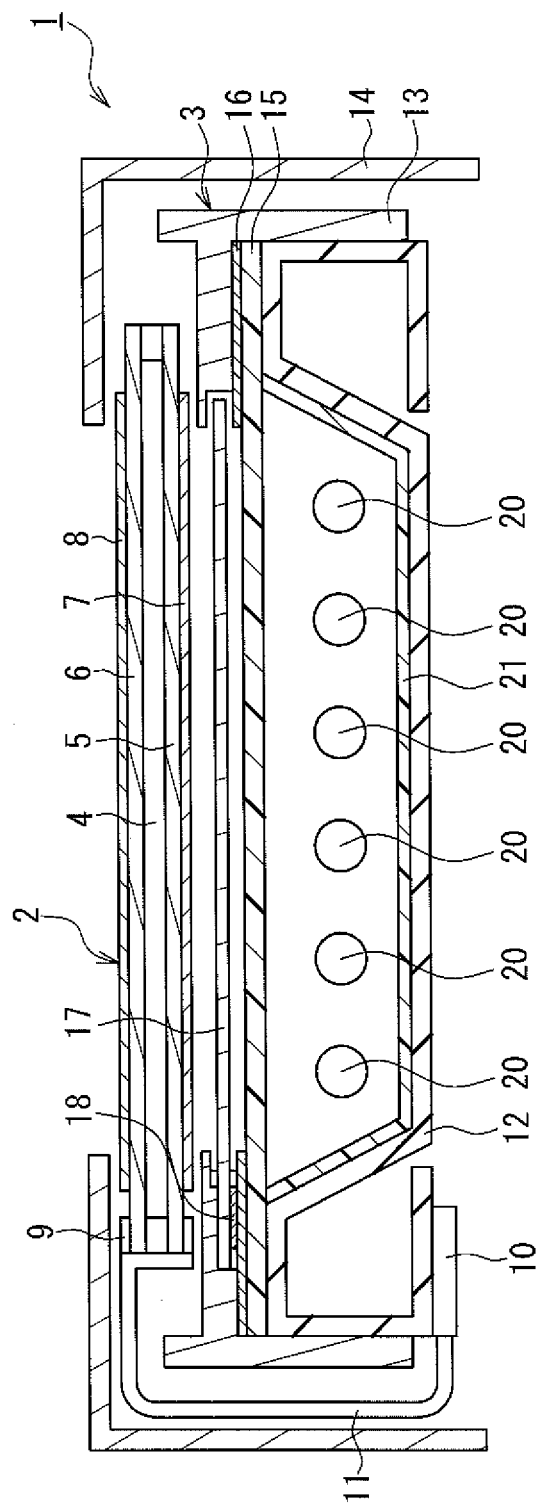
FIG. 1 is a schematic cross-sectional view showing a liquid crystal display device according to Embodiment 1 of the present invention.

FIG. 1 is a schematic cross-sectional view showing a liquid crystal display device according to Embodiment 1 of the present invention. In this figure, a liquid crystal display device 1 of the present embodiment is provided with a liquid crystal panel 2 as a display portion to be set with an upper side of the figure as a viewer side (display surface side), and an illumination device 3 that is placed on a non-display surface side (lower side of the figure) of the liquid crystal panel 2 and generates illumination light for illuminating the liquid crystal panel 2.

The liquid crystal panel 2 includes a liquid crystal layer 4, an active matrix substrate 5 of the present invention and a color filter substrate 6 sandwiching the liquid crystal layer 4, and polarizing plates 7, 8 disposed respectively on the outside surfaces of the active matrix substrate 5 and the color filter substrate 6. Further, the liquid crystal panel 2 is provided with a drive device 9 for driving the liquid crystal panel 2 and a drive circuit device 10 connected to the drive device 9 via a flexible printed board 11. The liquid crystal panel 2 is configured so that the liquid crystal layer 4 can be driven on a pixel basis. Then, in the liquid crystal panel 2, the polarized state of the illumination light incident via the polarizing plate 7 is modulated by the liquid crystal layer 4, and the amount of light passing through the polarizing plate 8 is controlled, whereby a desired image is displayed.

The illumination device 3 is provided with a bottomed chassis 12 with the upper side of the figure (liquid crystal panel 2 side) opened, and a frame 13 set on the liquid crystal panel 2 side of the chassis 12. Further, the chassis 12 and the frame 13 are made of metal or synthetic resin and are sandwiched by a bezel 14 with a cross-section in an L-shape while the liquid crystal panel 2 is set above the frame 13. Thus, the illumination device 3 is incorporated in the liquid crystal panel 2 to be integrated as the transmission type liquid crystal display device 1 in which the illumination light is incident upon the liquid crystal panel 2 from the illumination device 3.

Further, the illumination device 3 has a diffusion plate 15 set so as to cover an opening of the chassis 12, an optical sheet 17 set above the diffusion plate 15 on the liquid crystal panel 2 side, and a reflective sheet 21 provided on an inner surface of the chassis 12. Further, in the illumination device 3, a plurality of (e.g., 6) cold cathode fluorescent tubes 20 are provided on a lower side of the liquid crystal panel 2 inside the chassis 12 to constitute a direct type illumination device 3. In the illumination device 3, light from each cold cathode fluorescent tube 20 is output as the above-mentioned illumination light from a light-emitting surface of the illumination device 3 placed opposed to the liquid crystal panel 2.

In the above description, although the configuration using the direct type illumination device 3 has been described, the present embodiment is not limited thereto, and an edge light type illumination device having a light guiding plate may be used. Further, illumination devices having light sources other than the cold cathode fluorescent tube, such as a hot cathode fluorescent tube and an LED can also be used.

The diffusion plate 15 is formed of, for example, a rectangular synthetic resin or glass material with a thickness of about 2 mm, and diffuses light from the cold cathode fluorescent tubes 20 to output it to the optical sheet 17 side. Further, the diffusion plate 15 is incorporated in the illumination device 3 in such a manner that the four sides of the diffusion plate 15 are placed on the frame-shaped surface provided on an upper side of the chassis 12 and the diffusion plate 15 is sandwiched between the frame-shaped surface of the chassis 12 and the inner surface of the frame 13 via a pressure member 16 that is capable of being deformed elastically. Further, in the diffusion plate 15, a substantially central portion thereof is supported by a transparent support member (not shown) set in the chassis 12, which prevents the diffusion plate 15 from being bent to an inner side of the chassis 12.

Further, the diffusion plate 15 is kept so as to move between the chassis 12 and the pressure member 16, and due to the influence of heat such as the heat generation of the cold cathode fluorescent tubes 20 and the increase in temperature in the chassis 12, even when the diffusion plate 15 undergoes expansion/contraction (plastic) deformation, the plastic deformation is absorbed by the elastic deformation of the pressure member 16, which minimizes a decrease in the diffusion of light from the cold cathode fluorescent tubes 20. Further, it is preferred to use the diffusion plate 15 of a glass material strong to heat, compared with synthetic resin, since the diffusion plate 15 is unlikely to be warped, yellowed, thermally deformed, etc. due to the above-mentioned influence by heat.

The optical sheet 17 includes a light-collecting sheet, for example, made of a synthetic resin film with a thickness of about 0.5 mm, so as to increase the brightness of the illumination light to the liquid crystal panel 2. Further, in the optical sheet 17, known optical sheet members such as a prism sheet, a diffusion sheet, and a polarization sheet for enhancing the display quality on the display surface of the liquid crystal panel 2 are appropriately laminated, if required. Then, the optical sheet 17 is configured so as to convert the light output from the diffusion plate 15 into planar light at a predetermined uniform brightness (for example, 5,000 cd/m$^2$) or more and allow the planar light to be incident upon the liquid crystal panel 2 side as illumination light. In addition to the above-mentioned description, for example, an optical member such as a diffusion sheet for adjusting the viewing angle of the liquid crystal panel 2 may be laminated appropriately above (display surface side) the liquid crystal panel 2.

Further, in the optical sheet 17, a protrusion protruding to the left side in FIG. 1 is formed at the center of a left end side of FIG. 1, which is to be the upper side of the liquid crystal display device 1 at a time of actual use. In the optical sheet 17, only the protrusion is sandwiched between the inner surface of the frame 13 and the pressure member 16 with the elastic member 18 interposed therebetween, and the optical sheet 17 is incorporated in the illumination device 3 so as to be able to expand/contract. Thus, even when expansion/contraction (plastic) deformation occurs in the optical sheet 17 due to the influence of heat such as heat generation of the cold cathode fluorescent tubes 20, free expansion/contraction deformation with respect to the protrusion can be performed, and wrinkles, bending, etc. are minimized in the optical sheet 17. As a result, in the liquid crystal display device 1, the degradation in display quality such as brightness unevenness, caused by the bending of the optical sheet 17, etc. can be minimized on the display surface of the liquid crystal panel 2.

As each cold cathode fluorescent tube 20, a straight tube is used, and electrode portions (not shown) provided at both ends are supported on the outer side of the chassis 12. Further, as each cold cathode fluorescent tube 20, a thinned tube excellent in emission efficiency with a diameter of 3.0 to 4.0 mm is used, and each cold cathode fluorescent tube 20 is kept in the chassis 12 with each distance from the diffusion plate 15 and the reflective sheet 21 kept at a predetermined distance by a light source holding tool (not shown). Further, the cold cathode fluorescent tubes 20 are placed so that the longitudinal direction thereof is parallel to the direction orthogonal to the direction in which the gravity acts. Consequently, in the cold cathode fluorescent tube 20, mercury (water vapor) sealed in therein is prevented from gathering on one end side of the longitudinal direction due to the action of gravity, and the lamp life is enhanced remarkably.

The reflective sheet 21 is composed of, for example, a metal thin film having a high reflectance such as aluminum or silver having a thickness of 0.2 to 0.5 mm, and is adapted to function as a reflective plate reflecting the light from the cold cathode fluorescent tubes 20 to the diffusion plate 15. Thus, in the illumination device 3, the light emitted from the cold cathode fluorescent tubes 20 can be reflected efficiently to the diffusion plate 15 side to enhance the use efficiency of the light and the brightness in the diffusion plate 15. In addition to this description, a reflective sheet member made of synthetic resin may be used in place of the metal thin film, or for example, a paint of a white color or the like having a high light reflectance may be applied to the inner surface of the chassis 12 to allow the inner surface to function as a reflective plate.

Figure 2:
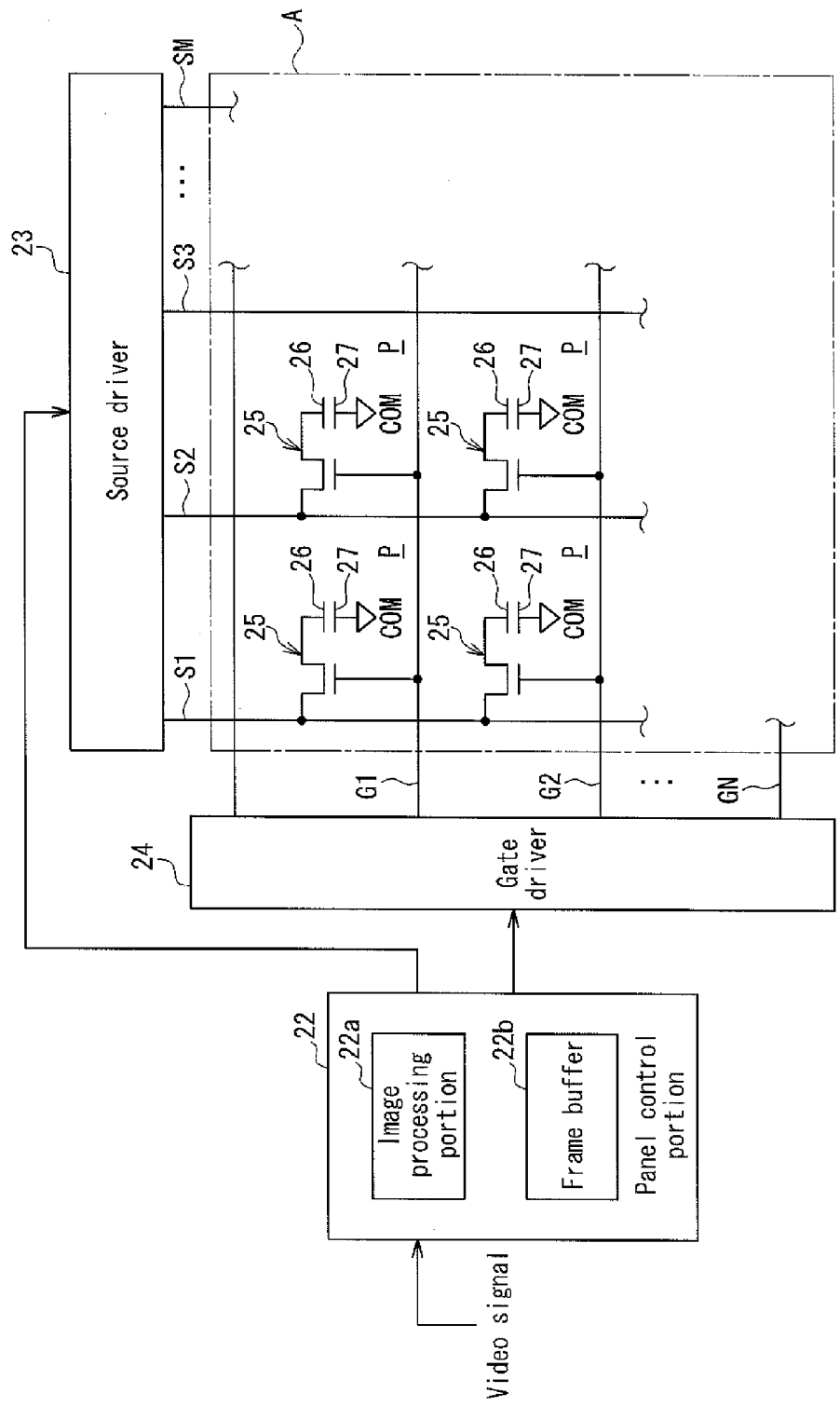
FIG. 2 is a diagram showing configurations of main portions of an active matrix substrate and the liquid crystal display device according to Embodiment 1.

Next, also referring to FIG. 2, the active matrix substrate 5 of the present embodiment is described specifically.

FIG. 2 is a diagram showing configurations of main portions of an active matrix substrate and a liquid crystal display device of Embodiment 1.

In FIG. 2, the liquid crystal display device 1 (FIG. 1) is provided with a panel control portion 22 that drives the liquid crystal panel 2 (FIG. 1) as the above-mentioned display portion that displays information such as characters and images, and a source driver 23 and a gate driver 24 that are operated based on instruction signals from the panel control portion 22.

The panel control portion 22 is provided in the drive circuit device 10 (FIG. 1) and receives a video signal from outside of the liquid crystal display device 1. Further, the panel control portion 22 includes an image processing portion 22a that performs predetermined image processing with respect to an input video signal and generates the respective instruction signals to the source driver 23 and the gate driver 24, and a frame buffer 22b capable of storing one frame of display data containing the input video signal. The panel control portion 22 drives the source driver 23 and the gate driver 24 in accordance with the input video signal, whereby information in accordance with the video signal is displayed on the liquid crystal panel 2.

The source driver 23 and the gate driver 24 are provided in the drive device 9 (FIG. 1), and placed on the active matrix substrate 5 of the present embodiment constituting an array substrate. Specifically, the source driver 23 is set along the horizontal direction of the liquid crystal panel 2 in a outside region of an effective display area A of the liquid crystal panel 2 as a display panel on the surface of the active matrix substrate 5. Further, the gate driver 24 is set along the vertical direction of the liquid crystal panel 2 in the outside region of the effective display area A on the surface of the active matrix substrate 5.

Further, the source driver 23 and the gate driver 24 are drive circuits driving a plurality of pixels P provided on the liquid crystal panel P side on a pixel basis, and a plurality of source wiring lines S1-SM (M is an integer of 2 or more; hereinafter, referred to as "S" collectively) and a plurality of gate wiring lines G1-GN (N is an integer of 2 or more; hereinafter, referred to as "G" collectively). The source wiring lines S and the gate wiring lines G respectively constitute data wiring lines and scanning wiring lines, which are arranged in a matrix so as to cross each other on a base material described later.

In the vicinity of each intersection between the source wiring lines S and the gate wiring lines G, a thin film transistor 25 as a switching element and the pixel P having a pixel electrode 26 connected to the thin film transistor 25 are provided. More specifically, in the active matrix substrate 5, in the respective regions partitioned in a matrix by the source wiring lines S and the gate wiring lines G, a plurality of regions of the pixels P are formed. The plurality of pixels P include red, green, and blue pixels. The red, green, and blue pixels are placed successively in parallel to the gate wiring lines G1-GN, for example, in this order.

Further, a gate electrode of the thin film transistor 25 provided on the pixel P basis is connected to each of the gate wiring lines G1-GN. On the other hand, a source electrode of the thin film transistor 25 is connected to each of the source wiring lines S1-SM. Further, the pixel electrode 26 provided on the pixel P basis is connected to the drain electrode of each thin film transistor 25. Further, in each pixel P, a common electrode 27 is opposed to the pixel electrode 26 so as to sandwich the liquid crystal layer 4 provided in the liquid crystal panel 2 therebetween.

Herein, the configuration of the pixel P in the active matrix substrate 5 of the present embodiment will be described specifically with reference to FIGS. 3 to 7.

Figure 3:
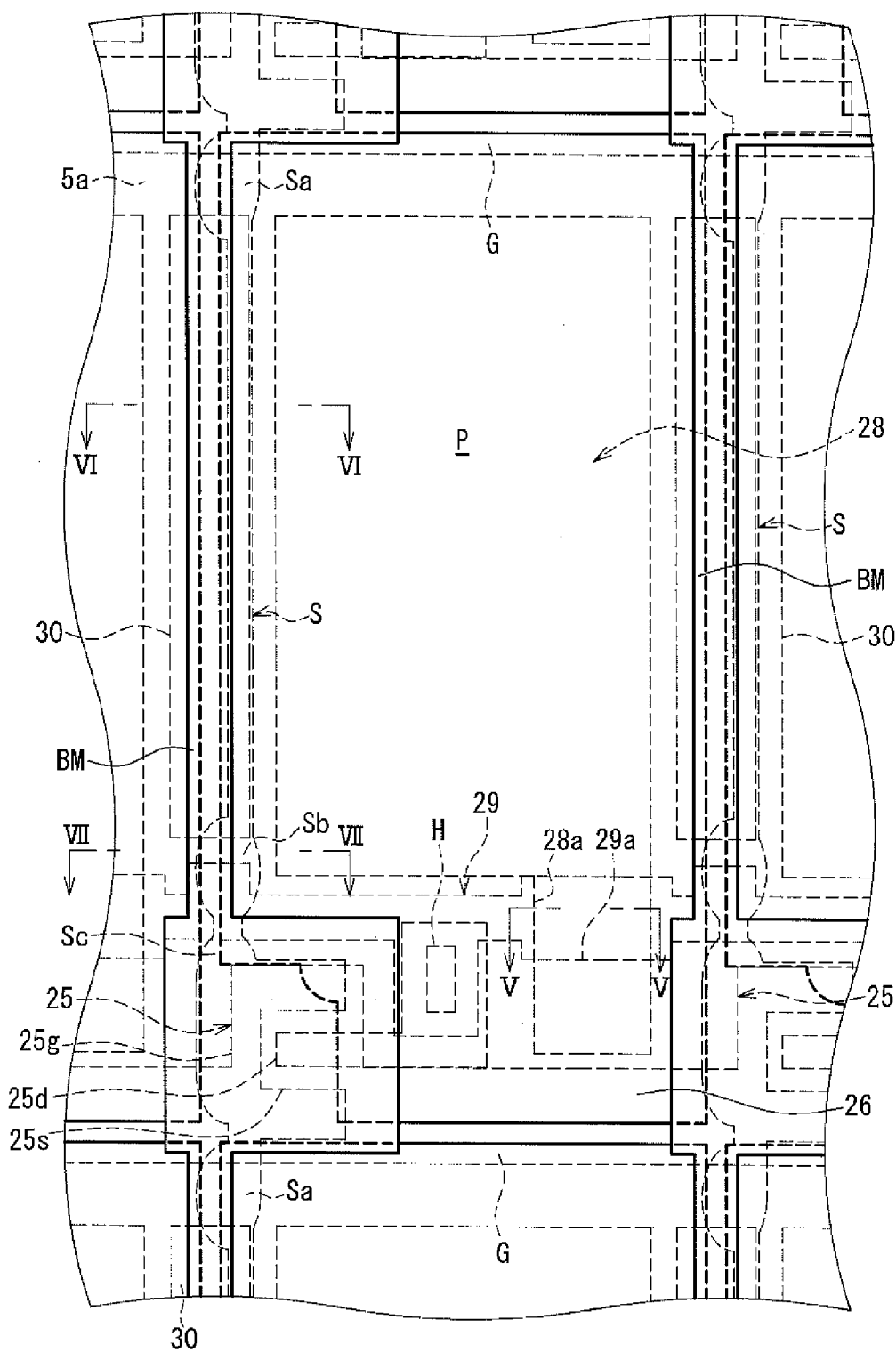
FIG. 3 is a diagram showing a specific configuration of a pixel shown in FIG. 2.
Figure 4A:
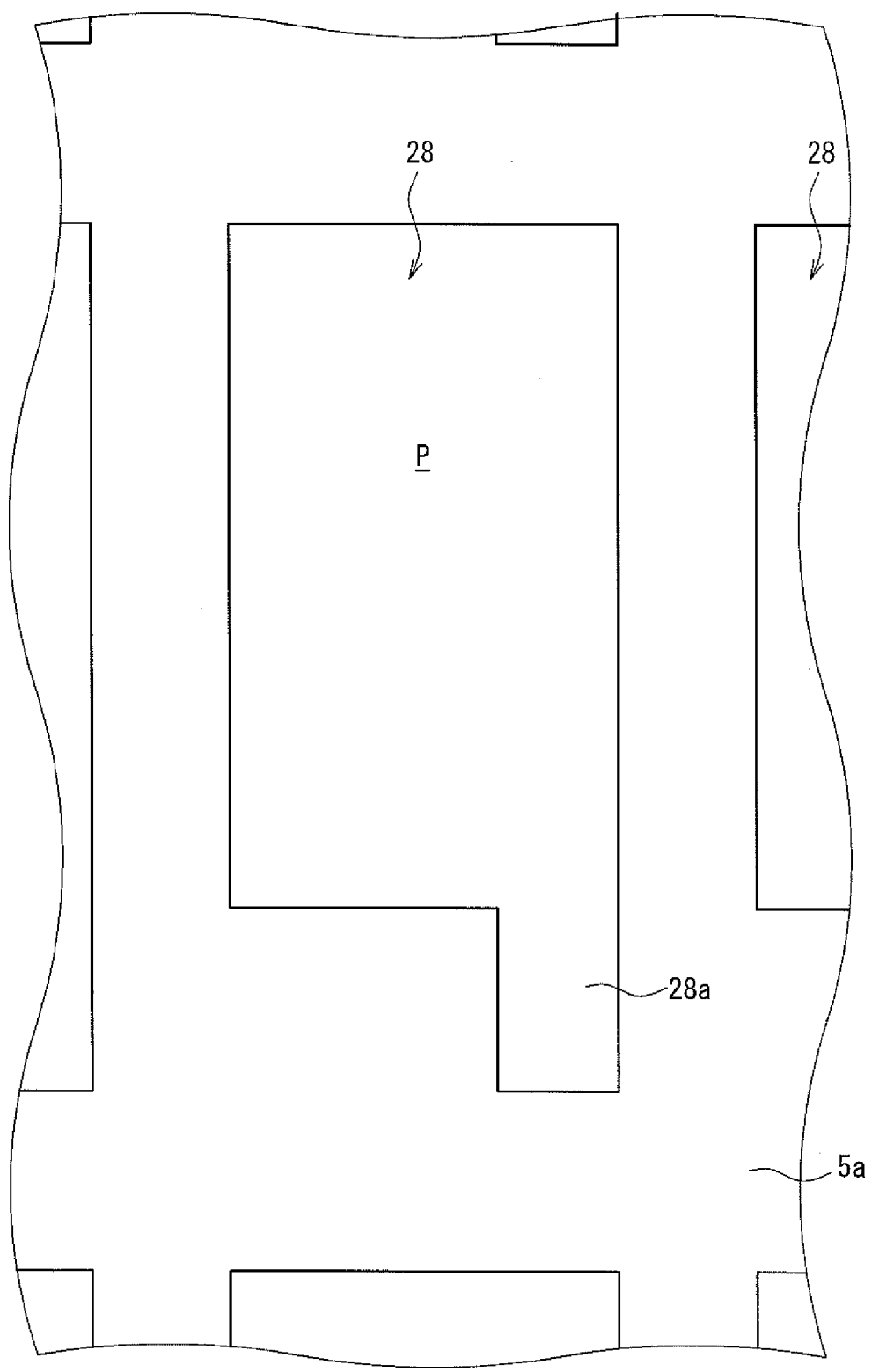
FIG. 4A is a plan view showing a configuration of an auxiliary capacity electrode shown in FIG. 3.
Figure 4B:
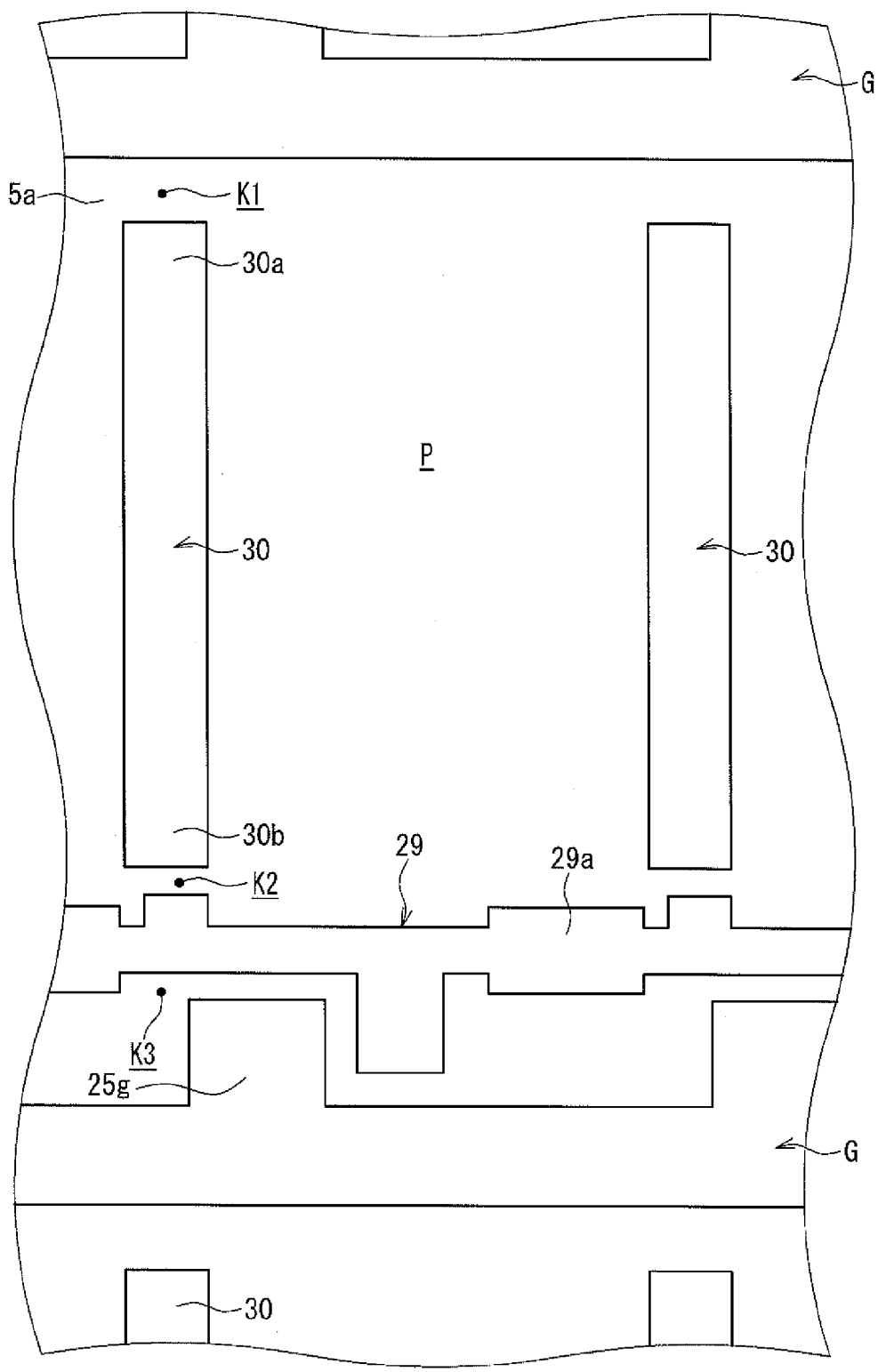
FIG. 4B is a plan view showing configurations of a gate wiring line, an auxiliary capacity wiring line, and a light shielding block shown in FIG. 3.
Figure 4C:
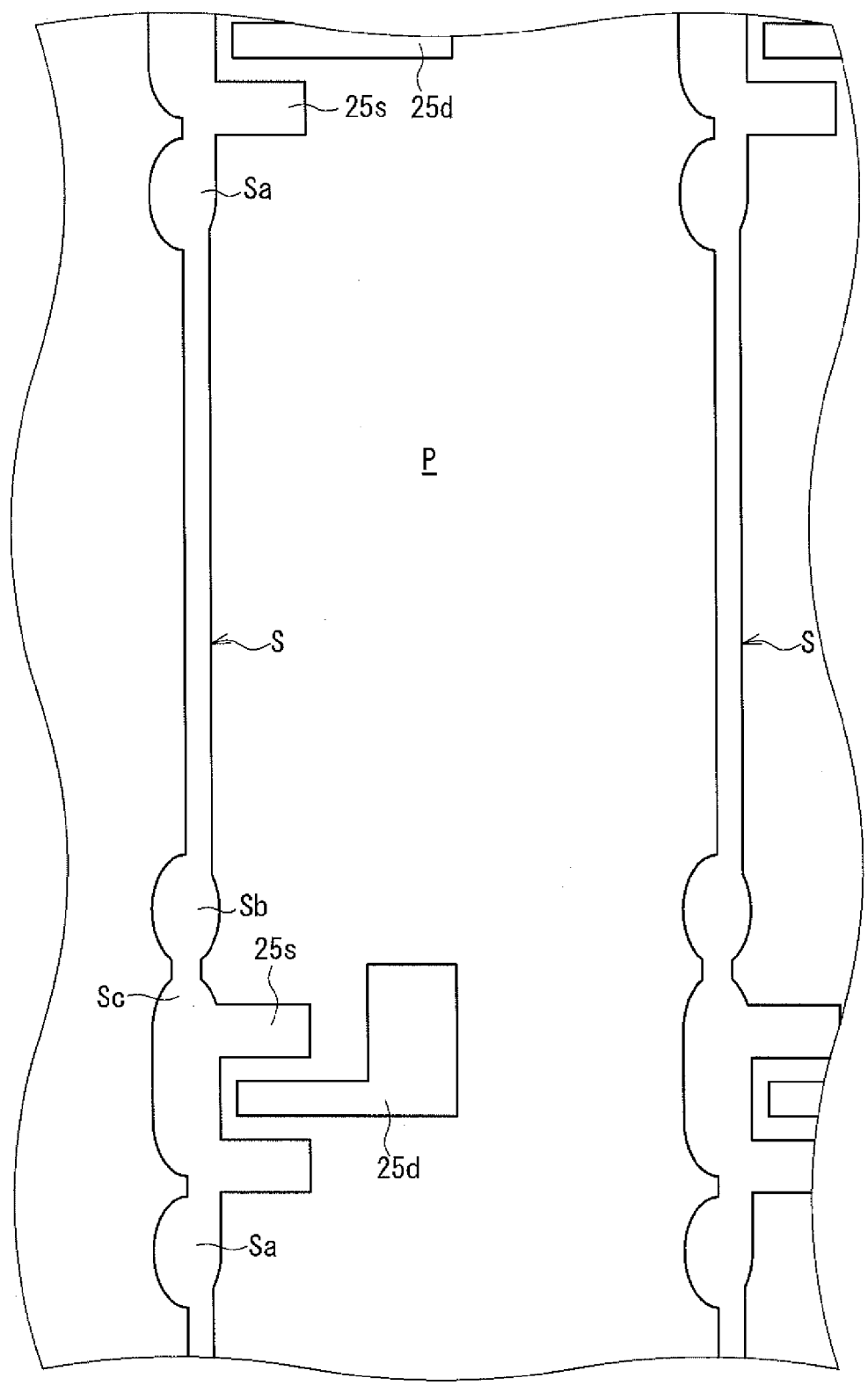
FIG. 4C is a plan view showing a configuration of a source wiring line shown in FIG. 3.
Figure 4D:
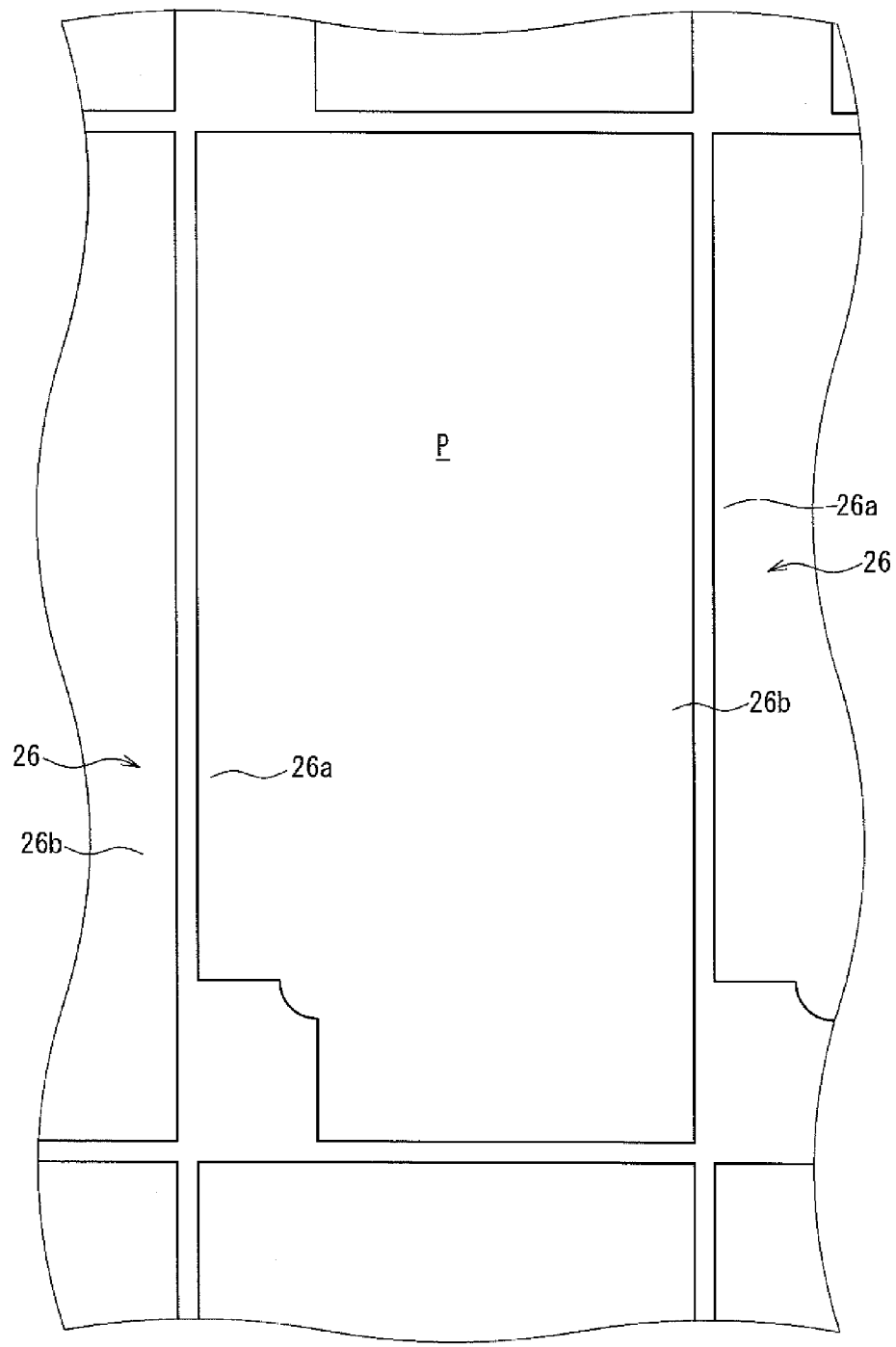
FIG. 4D is a plan view showing a configuration of a pixel electrode shown in FIG. 3.
Figure 5:
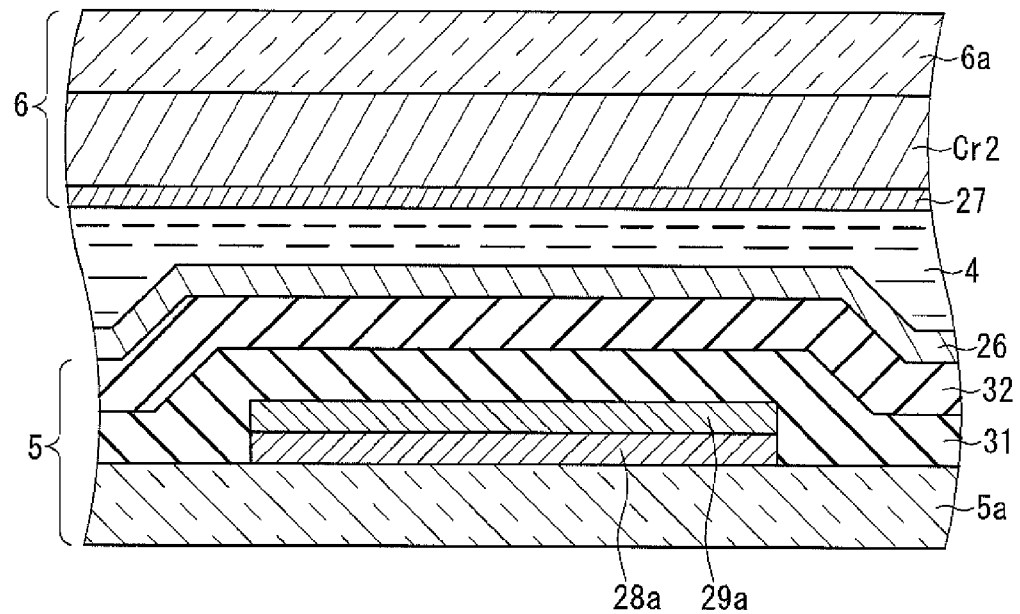
FIG. 5 is a cross-sectional view taken along a V-V line of FIG. 3.
Figure 6:
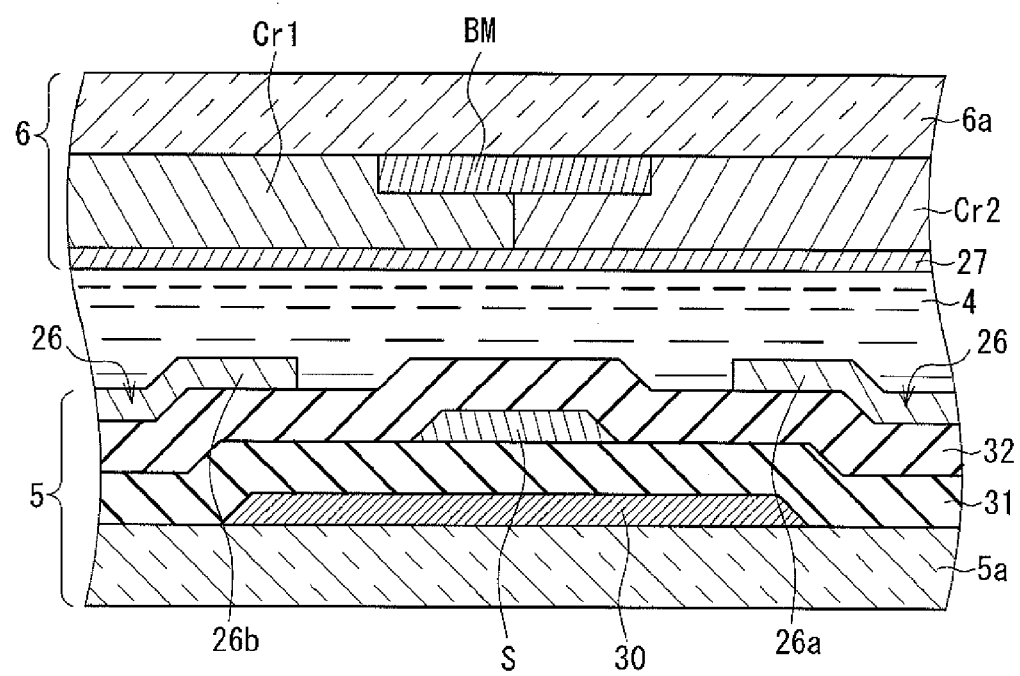
FIG. 6 is a cross-sectional view taken along a VI-VI line of FIG. 3.
Figure 7:
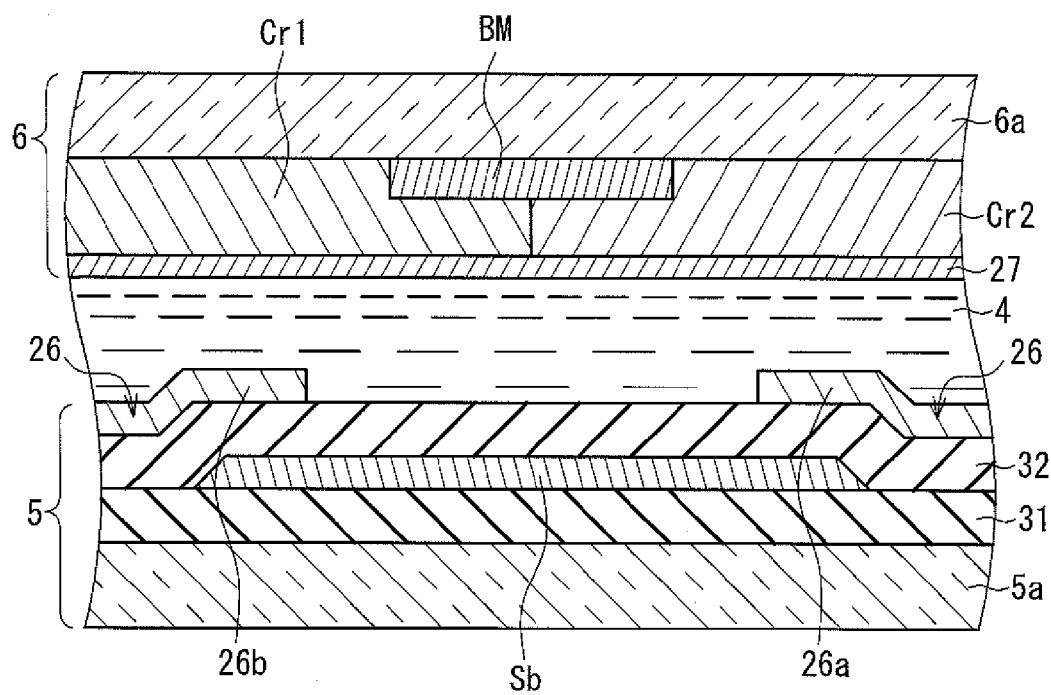
FIG. 7 is a cross-sectional view taken along a VII-VII line of FIG. 3.

FIG. 3 is a diagram showing a specific configuration of a pixel shown in FIG. 2. FIG. 4A is a plan view showing a configuration of an auxiliary capacity electrode shown in FIG. 3. FIG. 4B is a plan view showing configurations of a gate wiring line, an auxiliary capacity wiring line, and a light shielding block shown in FIG. 3. FIG. 4C is a plan view showing a configuration of a source wiring line shown in FIG. 3. FIG. 4D is a plan view showing a configuration of a pixel electrode shown in FIG. 3. FIG. 5 is a cross-sectional view taken along a V-V line of FIG. 3. FIG. 6 is a cross-sectional view taken along a VI-VI line of FIG. 3, and FIG. 7 is a cross-sectional view taken along a VII-VII line of FIG. 3.

As shown in FIG. 3, in the active matrix substrate 5, the source wiring lines S and the gate wiring lines G are respectively provided in parallel in vertical and horizontal directions of FIG. 3, and the region of the pixel P is defined by two adjacent source wiring lines S and two adjacent gate wiring lines G. Further, a black matrix BM provided on the color filter substrate 6 (FIG. 1) side is set above the source wiring lines S and the thin film transistors 25.

Further, in the active matrix substrate 5, the source wiring lines S, the gate wiring lines G, the thin film transistors 25, the pixel electrodes 26, the auxiliary capacity electrodes 28, the auxiliary capacity wiring lines 29, and light shielding blocks 30 are formed on a base material 5a composed of a transparent glass material or synthetic resin material, for example.

Specifically, as shown in FIGS. 4A and 4B, in the active matrix substrate 5, the auxiliary capacity electrodes 28, the gate wiring lines G, the auxiliary capacity lines 29, and the light shielding blocks 30 are directly provided on the base material 5a. Each gate electrode line G is provided integrally with a gate electrode 25g of the thin film transistor 25.

Further, in the active matrix substrate 5 of the present embodiment, first, the auxiliary capacity electrodes 28 are formed on the base material 5 using, for example, photolithography, and then, the gate wiring lines G, the auxiliary capacity lines 29, and the light shielding blocks 30 are formed simultaneously with the same material using, for example, photolithography. Specifically, the auxiliary capacity electrodes 28 are formed of transparent electrodes, and formed on the base material 5a in a predetermined pattern by predetermined production processes such as exposure and etching using a mask. After that, the gate wiring lines G, the auxiliary capacity wiring lines 29, and the light shielding blocks 30 are formed of, for example, an aluminum alloy, and formed at a time on the base material 5a respectively in a predetermined pattern by predetermined production processes such as exposure and etching using a mask.

Further, on the base material 5a of the active matrix substrate 5 of the present embodiment, in a connecting portion between the auxiliary capacity electrode 28 and the auxiliary capacity wiring line 29, the auxiliary capacity wiring line 29 is provided on the auxiliary capacity electrode 28 to be connected to the auxiliary capacity electrode 28.

Specifically, in the auxiliary capacity electrode 28 and the auxiliary capacity wiring line 29, a connecting portion 28a and a connecting portion 29a for connecting the auxiliary capacity electrode 28 and the auxiliary capacity wiring line 29 to each other electrically are formed respectively. As shown in FIG. 5, in the connecting portion 28a and the connecting portion 29a, the connecting portion 28a of the auxiliary capacity electrode 28 is formed on the base material 5a, and the connecting portion 29a of the auxiliary capacity wiring line 29 is provided so as to cover the connecting portion 28a and so as to be in contact therewith. Then, the auxiliary capacity electrode 28 and the auxiliary capacity wiring line 29 are connected to each other electrically via the connecting portion 28a and the connecting portion 29a.

Further, in the liquid crystal display device 1 of the present embodiment, as shown in FIG. 5, the connecting portion 28a and the connecting portion 29a are provided on the base material 5a in the active matrix substrate 5, and a transparent insulating film 31 and a transparent insulating film 32 are formed successively so as to cover the connecting portion 28a and the connecting portion 29a. Further, as shown in FIG. 5, the color filter substrate 6 includes a base material 6a, a color filter layer Cr2 formed on the base material 6a, and a common electrode 27 provided so as to cover the color filter layer Cr2 in a region above the connecting portion 28a and the connecting portion 29a. The base material 6a is formed of, for example, a transparent glass material or synthetic resin material, in the same way as in the base material 5a. Further, the color filter layer Cr2 is composed of a color filter of any of red color (R), green color (G), and blue color (B).

When a voltage is applied to the auxiliary capacity wiring line 29 from a power source (not shown), the auxiliary capacity electrode 28 generates a predetermined auxiliary capacity between the auxiliary capacity electrode 28 and the pixel electrode 26.

Further, materials for the auxiliary capacity electrode 28 and the auxiliary capacity wiring line 29 are selected appropriately so as not to be subjected to galvanic corrosion with a developer used for patterning the gate wiring lines G, the auxiliary capacity wiring lines 29 and the light shielding blocks 30 in a predetermined shape.

Specifically, in the auxiliary capacity electrode 28, a transparent conductive film, for example, Indium Tin Oxide (ITO) is used as the above-mentioned transparent electrode. In addition to the above description, a transparent conductive film of IZO (Indium Zinc Oxide) or Indium Germanium Oxide (IGO) may be used in the auxiliary capacity electrode 28.

On the other hand, in the auxiliary capacity wiring line 29, the aluminum alloy containing aluminum and at least one element of carbon, silicon, cobalt, nickel, germanium, rhodium, palladium, and tin as an additive is used. Thus, in the present embodiment, the occurrence of the galvanic corrosion with the above-mentioned developer can be suppressed with reliability between the auxiliary capacity electrode 28 and the auxiliary capacity wiring line 29.

Further, in the present embodiment, the total % by weight of the additive is set in a range of 0.6% to 5.0% in the aluminum alloy constituting the auxiliary capacity wiring line 29, which can suppress the occurrence of the galvanic corrosion more reliably. Further, the sheet resistance of the aluminum alloy (auxiliary capacity wiring line 29) is, for example, 0.1 to 0.4 Ω/sq., which is ⅔ to 1/10 or less of that of the conventional example.

Herein, Table 1 shows an example of the results of a verification test conducted by the inventors of the present invention.

In the verification test, it was checked whether or not the galvanic corrosion occurs with the above-mentioned developer, when the composition of the auxiliary capacity wiring line 29 is changed. Table 1 shows the case where the galvanic corrosion does not occur as "○", and the case where the galvanic carrion occurs as "×".

TABLE 1

| Auxiliary capacity wiring line | |
|---|---|
| % by weight of additive in aluminum alloy | Test result |
| 0.50% | X |
| 0.60% | ○ |
| 1.00% | ○ |
| 3.20% | ○ |
| 5.00% | ○ |

As illustrated in Table 1, it was verified that, when the auxiliary capacity electrode 28 is made of, for example, ITO, and the auxiliary capacity wiring line 29 is made of an aluminum alloy in which % by weight of the additive is set in a range of 0.6% to 5.0%, the galvanic corrosion does not occur between the auxiliary capacity electrode 28 and the auxiliary capacity wiring line 29.

Returning to FIG. 4B, each light shielding block 30 is provided on the base material 5a so that an end portion 30a and an end portion 30b thereof are not connected to the gate wiring lines G and the auxiliary capacity wiring lines 29, respectively. That is, the light shielding block 30 is set on the base material 5a so that an unconnected separation region K1 is formed between the end portion 30a and the gate wiring line G and an unconnected separation region K2 is formed between the end portion 30b and the auxiliary capacity wiring line 29. Further, the gate wiring line G and the auxiliary capacity wiring line 29 are set on the base material 5a so that an unconnected separation region K3 is formed between the gate electrode 25g of the gate wiring line G and the auxiliary capacity wiring line 29.

Further, as described above, the light shielding block 30 is not connected to the gate wiring lines G or the auxiliary capacity wiring lines 29. Therefore, the light-shielding block 30 is provided in an electrically floated state in the active matrix substrate 5 so as not to cause unnecessary parasitic capacitance between the light shielding block 30 and the pixel electrode 26.

Further, the light shielding block 30 is set on the base material 5a so as to be opposed to the respective end portions 26a, 26b of the two adjacent pixel electrodes 26, and designed so as to shield the respective end portions 26a, 26b of the two adjacent pixel electrodes 26 from light. The light shielding block 30 prevents light leakage from between the two adjacent pixels P, in cooperation with widened portions (described later) provided at the source wiring lines S (described later in detail).

Further, as shown in FIG. 4C, the source wiring lines S and the drain electrodes 25d of the thin film transistors 25 are formed in a predetermined pattern. The source wiring lines S and the drain electrodes 25d are formed of, for example, an aluminum alloy or a laminated film of an aluminum alloy and a high-dielectric material. Further, on the base material 5a, the source wiring lines S and the drain electrodes 25d are formed above the gate wiring lines G, the auxiliary capacity electrodes 28, the auxiliary capacity wiring lines 29, and the light-shielding blocks 30 with an insulating film (described later) interposed therebetween. Further, in each source wiring line S, a source electrode 25s of the thin film transistor 25 is provided integrally. Further, the drain electrode 25d is electrically connected to the pixel electrode 26 via a contact hole H (FIG. 3).

Further, the source wiring line S is provided with widened portions Sa, Sb, and Sc in which the wiring line width is set to be larger. The widened portions Sa to Sc are configured so as to cover the separation regions K1 to K3, respectively, and shield the corresponding separation regions K1 to K3 from light. That is, the widened portion Sa is configured so as to cover the separation region K1 between the gate wiring line G and the end portion 30a of the light-shielding block 30 and shield the separation region K1 from light. Further, the widened portion Sb is configured so as to cover the separation region K2 between the auxiliary capacity wiring line 29 and the end portion 30b of the light-shielding block 30 and shield the separation region K2 from light. Further, the widened portion Sc is configured so as to cover the separation region K3 between the gate wiring line G and the auxiliary capacity wiring line 29 and shield the separation region K3 from light.

Further, as shown in FIG. 4D, the pixel electrodes 26 are formed in a predetermined shape. The pixel electrodes 26 are formed above the source wiring lines S and the drain electrodes 25d on the base material 5a with an insulating film (described later) interposed therebetween. Further, the pixel electrode 26 is made of a transparent electrode film such as an ITO film. Further, in the two adjacent pixel electrodes 26, the light-shielding blocks 30 are provided so as to be opposed to each other below the end portion 26a and the end portion 26b.

Further, in the liquid crystal display device 1 of the present embodiment, as shown in FIG. 6, the light-shielding block 30 is provided on the base material 5a, and the insulating film 31 is formed so as to cover the light-shielding block 30, in the active matrix substrate 5. Further, in the active matrix substrate 5, the source wiring line S is provided on the insulating film 31 at a position immediately above the center of the light-shielding block 30, and the insulating film 32 is formed so as to cover the source wiring line S. Further, in the active matrix substrate 5, the pixel electrode 26 is provided on the insulating film 32.

Further, in the active matrix substrate 5, the left end portion of the light-shielding block 30 is provided so as to be opposed to the end portion 26b of the pixel electrode 26 on the left side, and the right end portion of the light-shielding block 30 is provided so as to be opposed to the end portion 26a of the pixel electrode 26 on the right side. Thus, the light-shielding block 30 can shield the respective end portions 26a, 26b of the two adjacent pixel electrodes 26 from light, and prevent light leakage from between the two adjacent pixels P with reliability. As a result, in the liquid crystal display device 1 of the present embodiment, the width of the black matrix BM can be rendered small with reliability.

In the active matrix substrate 5, as shown in FIG. 6, the source wiring lines S and the pixel electrodes 26 are provided at positions away from each other in a vertical direction of the figure. Therefore, the parasitic capacitance generated between the source wiring lines S and the pixel electrodes 26 can be reduced remarkably.

Further, as shown in FIG. 6, on an upper side of the source wiring line S, a base material 6a, a black matrix BM and color filter layers Cr1, Cr2 formed on the base material 6a, and a common electrode 27 provided so as to cover the color filter layers Cr1, Cr2 and the black matrix BM are set in the color filter substrate 6. The color filter layers Cr1, Cr2 are formed of color filters of two different colors of red (R), green (G), and blue (B).

Further, in the liquid crystal display device 1 of the present embodiment, light leakage from between the two adjacent pixels P is prevented by the widened portions Sa to Sc provided on the source wiring line S in a part where the light-shielding block 30 is not provided. Specifically, as shown in FIG. 7, the insulating film 31 is provided on the base material 5a and the widened portion Sb is formed on the insulating film 31, in the separation region K2. Further, the insulating film 32 is provided so as to cover the widened portion Sb, and the pixel electrode 26 is provided on the insulating film 32. Herein, in the widened portion Sb, the left end portion thereof is provided so as to be opposed to the end portion 26b of the pixel electrode 26 on the left side, and the right end portion thereof is provided so as to be opposed to the end portion 26a of the pixel electrode 26 on the right side. Thus, the widened portion Sb can shield the respective end portions 26a, 26b of the two adjacent pixel electrodes 26 from light and prevent light leakage from between the two adjacent pixel electrodes P.

In the active matrix substrate 5 of the present embodiment configured as described above, the auxiliary capacity electrodes 28 formed of ITO (transparent electrodes) are provided on the base material 5a, and the auxiliary capacity wiring lines 29 made of an aluminum alloy are connected to the auxiliary capacity electrodes 28. Thus, in the active matrix substrate 5 of the present embodiment, the auxiliary capacity wiring lines 29 made of metal having a resistance lower than that of the conventional example are used. This enables the power consumption to be reduced in the active matrix substrate 5 of the present embodiment, unlike the conventional example. Further, in the active matrix substrate 5 of the present embodiment, it is not necessary to increase a voltage to be applied to the auxiliary capacity wiring lines 29, unlike the conventional example, and hence, the pitch size of the two adjacent auxiliary capacity wirings 29 is reduced to narrow down a frame. Further, in the active matrix substrate 5 of the present embodiment, unlike the conventional example, the line width of the auxiliary capacity wiring lines 29 can be reduced to increase the opening ratio of the pixels.

Further, in the base material 5a of the active matrix substrate 5 of the present embodiment, as shown in FIG. 5, the auxiliary capacity wiring line 29 is provided on the auxiliary capacity electrode 28 to be connected thereto in a connecting portion between the auxiliary capacity electrode 28 and the auxiliary capacity wiring line 29. Thus, in the present embodiment, since the auxiliary capacity electrode 28 and the auxiliary capacity wiring line 29 are connected to each other directly, and hence, the active matrix substrate 5 with a simple configuration can be obtained easily.

Further, in the present embodiment, the active matrix substrate 5, in which the power consumption can be reduced and the frame can be narrowed down and the opening ratio can be increased, is used in the liquid crystal panel (display portion) 2. Therefore, the liquid crystal display device 1 with low power consumption, having the high-definition liquid crystal panel 2, can be configured easily.

In the above description, the configuration in which the black matrix BM is provided on the color filter substrate 6 side is shown. However, in the liquid crystal display device 1 of the present embodiment, light leakage from between the two adjacent pixels P can be prevented by the light-shielding blocks 30 and the widened portions Sa to Sc of the source wiring lines S. Therefore, in the liquid crystal display device 1 of the present embodiment, it is also possible to omit the setting of the black matrix BM (same applies to Embodiments 2 and 3 described later).

Embodiment 2

Figure 8:
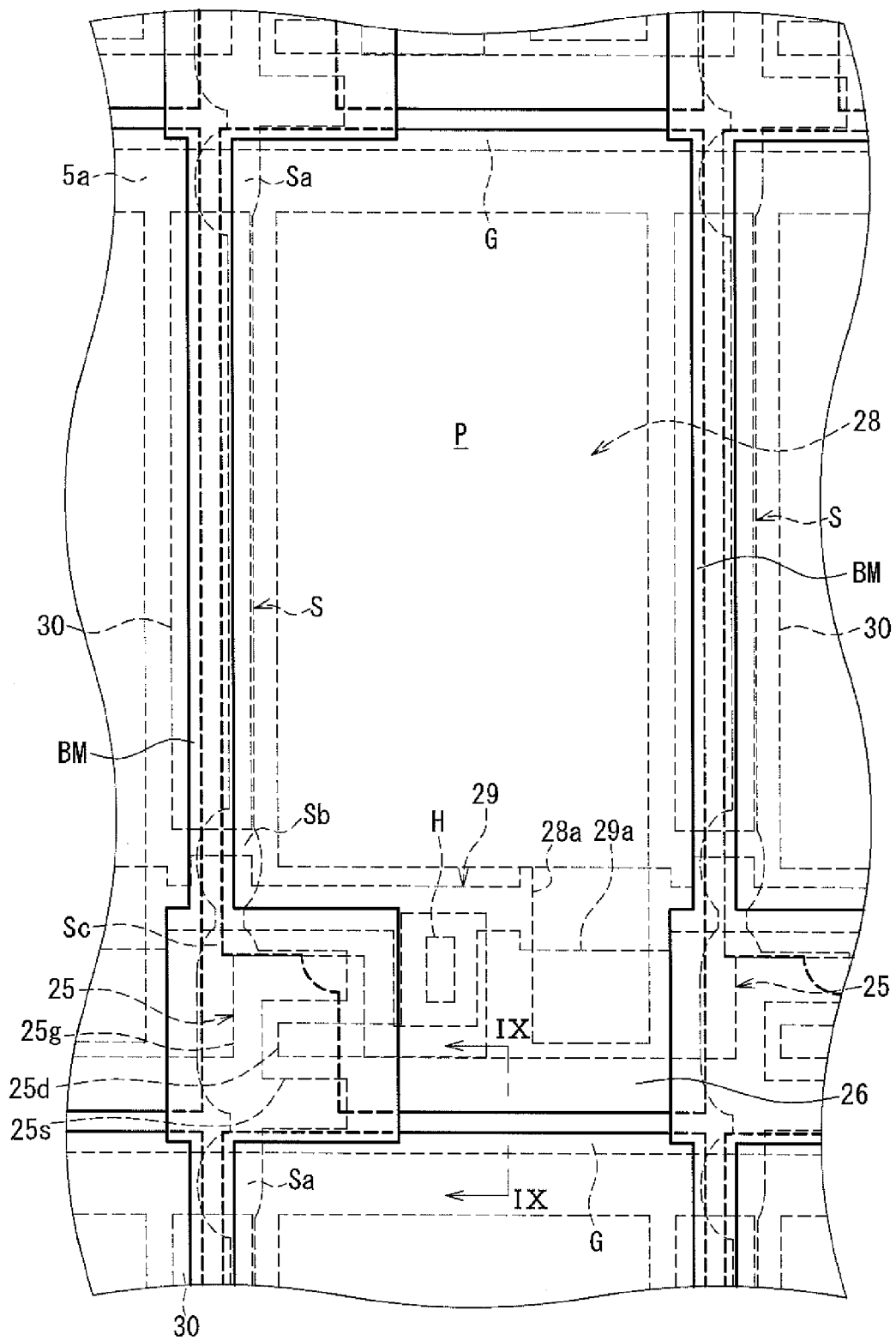
FIG. 8 is a diagram showing a specific configuration of a pixel in an active matrix substrate according to Embodiment 2 of the present invention.
Figure 9:
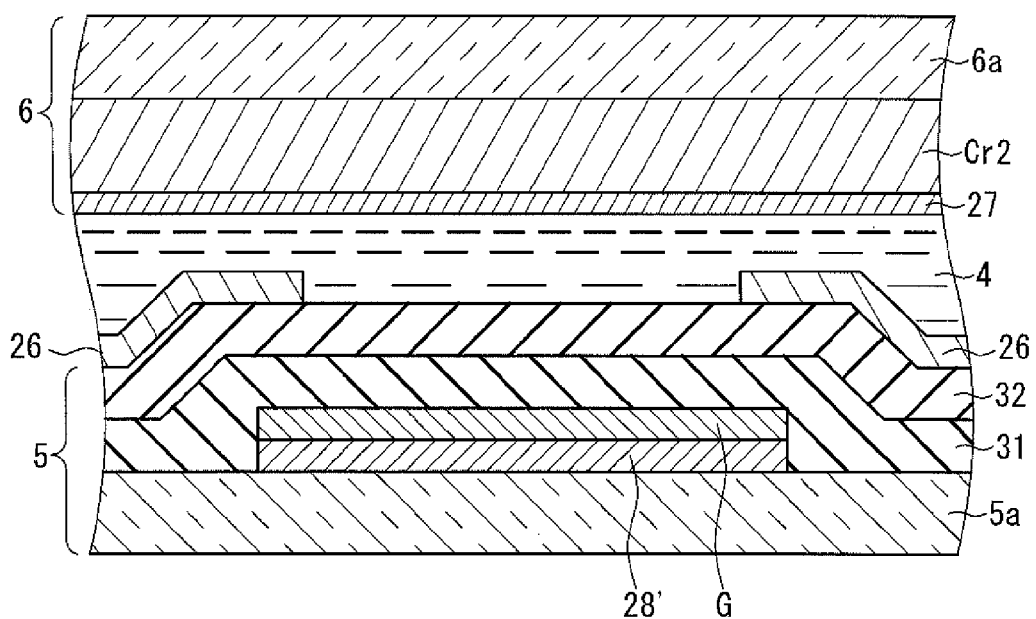
FIG. 9 is a cross-sectional view taken along a IX-IX line of FIG. 8.

FIG. 8 is a diagram illustrating a specific configuration of a pixel in an active matrix substrate according to Embodiment 2 of the present invention. FIG. 9 is a cross-sectional view taken along a IX-IX line of FIG. 8. In this figure, the main difference between the present embodiment and Embodiment 1 lies in that gate wiring lines are provided on transparent electrodes constituting the auxiliary capacity electrodes on a base material. Elements common to those of Embodiment 1 are denoted with the same reference numerals as those therein, and the repeated descriptions thereof will be omitted.

That is, as shown in FIG. 8, in the active matrix substrate 5 of the present embodiment, the auxiliary capacity electrode 28 is provided between two gate wiring lines G in the same way as in Embodiment 1. Further, in the active matrix substrate 5 of the present embodiment, as shown in FIG. 9, the gate wiring line G is provided on a transparent electrode 28' constituting the auxiliary capacity electrode 28 on the base material 5a.

Further, as described above, the gate wiring lines G are made of the same material as that of the auxiliary capacity wiring lines 29 simultaneously. That is, the gate wiring line G is made of an aluminum alloy containing, as an additive, at least one element of carbon, silicon, cobalt, nickel, germanium, rhodium, palladium, and tin. Thus, in the present embodiment, the occurrence of the galvanic corrosion with the developer can be suppressed with reliability between the gate wiring line G and the transparent electrode 28' (that is, the auxiliary capacity electrode 28) made of ITO.

Further, in the present embodiment, in the same way as in Embodiment 1, the total % by weight of the additive is set in a range of 0.6% to 5.0% in an aluminum alloy constituting the gate wiring lines G, whereby the occurrence of the galvanic corrosion can be suppressed with more reliability.

Herein, the process of producing the gate wiring lines G and the auxiliary capacity electrodes 28 in the active matrix substrate 5 of the present embodiment is described specifically, using FIG. 10.

FIG. 10 shows views illustrating specific production steps of a gate wiring line and an auxiliary capacity electrode of FIG. 8.

Figure 10A:
FIG. 10 shows views illustrating specific production steps of a gate wiring line and an auxiliary capacity electrode of FIG. 8.

As shown in FIG. 10A, first, ITO is formed to a film having a predetermined film thickness on the base material 5a, for example, by sputtering to obtain a transparent electrode 28'. The aluminum alloy is formed to a film having a predetermined film thickness on the transparent electrode 28', for example, by sputtering to obtain an aluminum alloy layer 50.

Figure 10B:
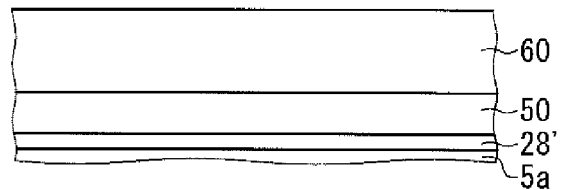

Next, as shown in FIG. 10B, for example, a resin film having photosensitivity with respect to a g-ray, an h-ray, and an i-ray is applied to the aluminum alloy layer 50 to form a resist 60.

Figure 10C:
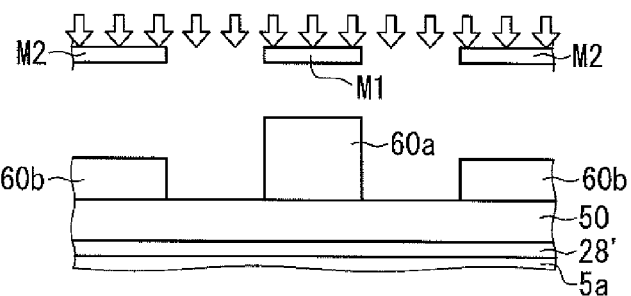
Figure 10D:
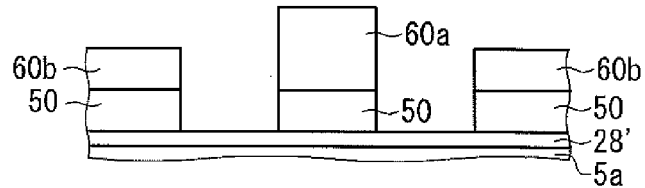

Then, as shown in FIG. 10C, halftone exposure using halftone masks M1, M2 is conducted to leave resists 60a, 60b on the aluminum alloy layer 50 only in necessary parts (that is, the shape of the gate wiring lines G). In the halftone exposure, the halftone masks M1, M2 having different transmittances with respect to the g-ray, the h-ray, and the i-ray used for exposure are used, and as shown in FIG. 10C, film thicknesses of the resists 60a, 60b left on the aluminum alloy layer 50 are varied Next, as shown in FIG. 10D, parts of the aluminum alloy layer 50 and the transparent electrode 28', which are not protected by the resists 60a, 60b, are removed, for example, by wet etching.

Figure 10E:
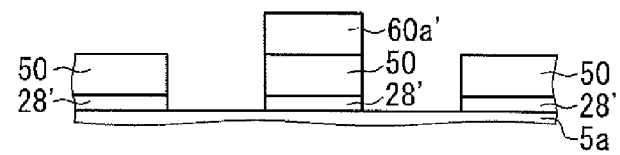

Then, as shown in FIG. 10E, the resist 60b on the aluminum alloy layer 50, in which the gate wiring line G is not formed, is removed, for example, by conducting $O_2$ plasma ashing for a predetermined period of time. That is, in the step of $O_2$ plasma ashing, resist removal is conducted only by the film thickness of the resist 60b, and in the resist 60a formed so as to be thicker than the resist 60b by the halftone exposure, a resist 60a' is left on the aluminum alloy layer 50 with a thickness reduced by the film thickness of the resist 60b.

Figure 10F:
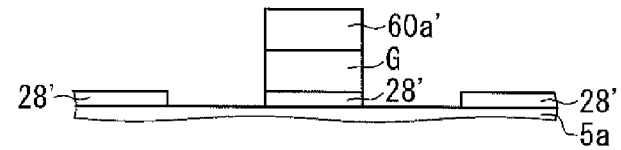

Next, as shown in FIG. 10F, etching is conducted for forming the gate wiring line G. That is, parts of the aluminum alloy layer 50 not protected by the resist 60a' are removed, whereby the gate wiring line G is formed between the resist 60a' and the transparent electrode 28', as shown in FIG. 10F.

Figure 10G:
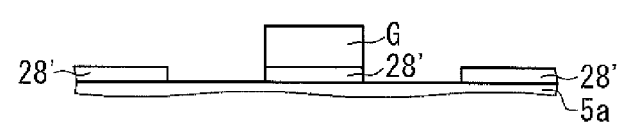

Finally, as shown in FIG. 10G, the resist is removed using, for example, a predetermined resist peeling solution. Thus, the resist 60a' on the gate wiring line G is removed, and the gate wiring line G is provided on the transparent electrode 28'. The transparent electrode 28' is used as the auxiliary capacity electrode 28 depending upon the position where the transparent electrode 28' is formed. Further, due to the protection by the resist 60a', the connecting portion 29a of the auxiliary capacity wiring 29 and the connecting portion 28a of the auxiliary capacity electrode 28, which is provided below the connecting portion 29a and connected thereto, can be formed.

As described above, in the active matrix substrate 5 of the present embodiment, ITO and an aluminum alloy are formed successively on the base material 5a, and thereafter, half-tone exposure is conducted, whereby the production process of the active matrix substrate 5 can be simplified easily, compared with Embodiment 1. That is, in Embodiment 1, exposure needs to be conducted for each formation of the auxiliary capacity electrode 28 and the gate wiring line G. In the present embodiment, the auxiliary capacity electrode 28 and the gate wiring line G are formed by one halftone exposure.

Due to the above-mentioned configuration, in the present embodiment, functions and effects similar to those of Embodiment 1 can be exhibited. Further, in the active matrix substrate 5 of the present embodiment, the gate wiring lines (scanning wiring lines) G are made of the above-mentioned aluminum alloy, and the gate wiring lines G are provided on the transparent electrodes 28' on the base material 5a. Thus, according to the present embodiment, as shown in FIG. 10, the gate wiring lines G and the auxiliary capacity wiring lines 28 can be formed simultaneously, and the production process of the active matrix substrate 5 can be simplified easily.

Embodiment 3

Figure 11:
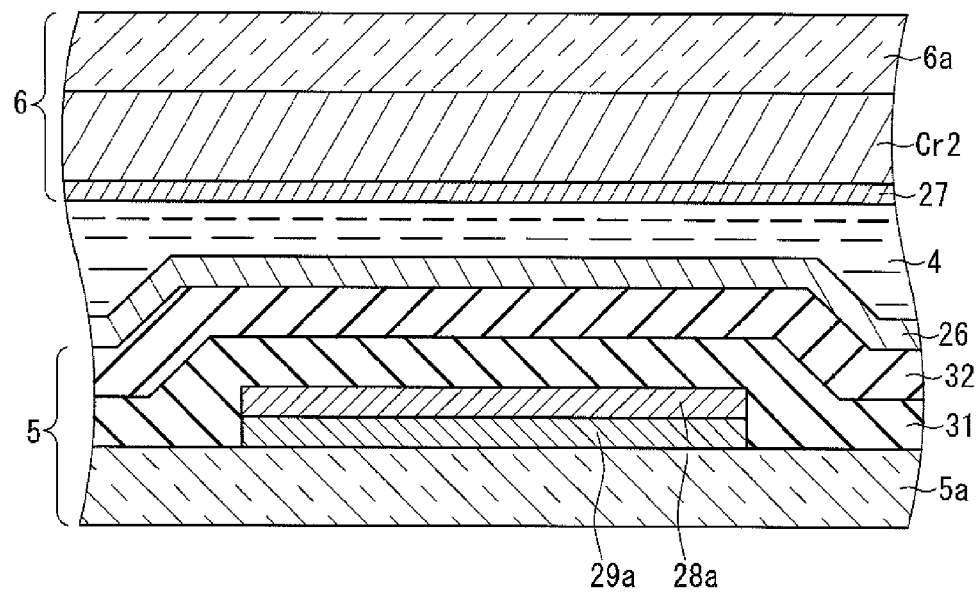
FIG. 11 is a cross-sectional view showing a connection portion between an auxiliary capacity electrode and an auxiliary capacity wiring line in an active matrix substrate according to Embodiment 3 of the present invention.

FIG. 11 is a cross-sectional view showing a connecting portion between an auxiliary capacity electrode and an auxiliary capacity wiring line in an active matrix substrate according to Embodiment 3 of the present invention. In this figure, the main difference between the present embodiment and Embodiment 1 lies in that, in a connecting portion between the auxiliary capacity electrode and the auxiliary capacity wiring line on the base material, the auxiliary capacity electrode is provided on the auxiliary capacity wiring line to be connected thereto. Elements common to those of Embodiment 1 are denoted with the same reference numerals as those therein, and the repeated descriptions thereof will be omitted.

That is, in FIG. 11, in the active matrix substrate 5 of the present embodiment, the auxiliary capacity electrode 28 is provided on the auxiliary capacity wiring line 29 to be connected thereto in a connecting portion between the auxiliary capacity electrode 28 and the auxiliary capacity wiring line 29. Specifically, as shown in FIG. 11, the connecting portion 29a of the auxiliary capacity wiring line 29 is formed on the base material 5a, and the connecting portion 28a of the auxiliary capacity electrode 28 is provided so as to cover the connecting portion 29a and to be in contact therewith.

In other words, in the active matrix substrate 5 of the present embodiment, the gate wiring lines G, the auxiliary capacity wiring lines 29, and the light-shielding blocks 30 are directly formed on the base material 5a, and thereafter, the auxiliary capacity electrodes 28 are directly provided on the base material 5a. Specifically, the gate wiring lines G, the auxiliary capacity wiring lines 29, and the light-shielding blocks 30 are made of, for example, an aluminum alloy, and are formed at a time on the base material 5a in each predetermined pattern by a predetermined production process such as exposure and etching using a mask. After that, the auxiliary capacity electrodes 28 are made of transparent electrodes, and are formed on the base material 5a in a predetermined pattern by a predetermined production process such as exposure and etching using a mask.

Further, in the active matrix substrate 5 of the present embodiment, as materials for the auxiliary capacity electrodes 28 and the auxiliary capacity wiring lines 29, those which do not cause galvanic corrosion with a developer used for patterning the gate wiring lines G, the auxiliary capacity wiring lines 29, and the light-shielding blocks 30 in a predetermined shape and have a satisfactory contact resistance between an aluminum alloy and ITO are selected appropriately in the same way as in Embodiment 1.

Specifically, in the auxiliary capacity electrodes 28, a transparent conductive film, for example, ITO or Indium Zinc Oxide (IZO) is used as the above-mentioned transparent electrode.

On the other hand, in the auxiliary capacity wiring lines 29, the above-mentioned aluminum alloy containing aluminum and at least one element of carbon, silicon, cobalt, nickel, germanium, rhodium, palladium, and tin as an additive is used. Consequently, in the present embodiment, the occurrence of the galvanic corrosion with the above-mentioned developer can be suppressed with reliability between the auxiliary capacity electrode 28 and the auxiliary capacity wiring line 29, and the contact resistance between the aluminum alloy and ITO or IZO becomes satisfactory.

Further, in the present embodiment, the total % by weight of the additive is set in a range of 0.3% to 5.0% in the aluminum alloy constituting the auxiliary capacity wiring line 29, which can suppress the occurrence of the galvanic corrosion more reliably. Further, the sheet resistance of the aluminum alloy (auxiliary capacity wiring line 29) is, for example, 0.1 to 0.4 Ω/sq., which is ⅔ to ¹⁄₁₀ or less of that of the conventional example.

Herein, Table 2 shows an example of the results of a verification test conducted by the inventors of the present invention.

In the verification test, it was checked whether or not the galvanic corrosion occurs with the above-mentioned developer, when the composition of the auxiliary capacity wiring line 29 is changed. Table 1 shows the case where the galvanic corrosion does not occur as "○", and the case where the galvanic carrion occurs as "×".

TABLE 2

| Auxiliary capacity wiring line | |
|---|---|
| % by weight of additive in aluminum alloy | Test result |
| 0.20% | X |
| 0.30% | ○ |
| 0.50% | ○ |
| 1.00% | ○ |
| 3.20% | ○ |
| 5.00% | ○ |

As illustrated in Table 2, it was verified that, when the auxiliary capacity electrode 28 is made of ITO or IZO, and the auxiliary capacity wiring line 29 is made of an aluminum alloy in which % by weight of the additive is set in a range of 0.3% to 5.0%, the galvanic corrosion does not occur between the auxiliary capacity electrode 28 and the auxiliary capacity wiring line 29.

With the above-mentioned configuration, in the present embodiment, the functions and effects similar to those of Embodiment 1 can be exhibited. Further, in the active matrix substrate 5 of the present embodiment, as shown in FIG. 11, the auxiliary capacity electrode 28 is provided on the auxiliary capacity wiring line 29 to be connected thereto in a connecting portion between the auxiliary capacity electrode 28 and the auxiliary capacity wiring line 29 on the base material 5a. Consequently, in the active matrix substrate 5 of the present embodiment, as shown in Table 2, the number of kinds of the above-mentioned transparent electrodes constituting the auxiliary capacity electrodes 28 can be increased, compared with Embodiment 1. Further, in the present embodiment, since the auxiliary capacity electrode 28 and the auxiliary capacity wiring line 29 are directly connected in the same way as in Embodiment 1, the active matrix substrate 5 with a simple configuration can be configured easily.

The above-mentioned embodiments are shown for illustrative purposes and are not limiting. The technical range of the present invention is defined by the claims, and all the modifications within the range equivalent to the configuration recited in the claims are also included in the technical range of the present invention.

For example, in the above-mentioned description, the case where the present invention is applied to a transmission type liquid crystal display device has been described. However, the display device of the present invention is not particularly limited as long as a display panel having an active matrix substrate is used in a display portion. That is, the display device of the present invention may be the one that uses an active matrix substrate having a plurality of data wiring lines and a plurality of scanning wiring lines arranged in a matrix and pixels having switching elements provided in the vicinity of intersections of the data wiring lines and the scanning wiring lines and pixel electrodes connected to the switching elements.

Specifically, the display device of the present invention can be applied to various display devices using an active matrix substrate, such as a semi-transmission type or reflection type liquid crystal panel, an organic electronic luminescence (EL) element, an inorganic EL element, and a field emission display.

In the above-mentioned description, the case has been described where the light-shielding blocks, the gate wiring lines (scanning wiring lines), and the auxiliary capacity wiring lines are formed in the same layer on a base material and made of the same material, and source wiring lines (data wiring lines) are provided above the light-shielding blocks, the scanning wiring lines, and the auxiliary capacity wiring lines. However, the active matrix substrate of the present invention is not particularly limited, as long as the active matrix substrate includes a base material provided in such a manner that the data wiring lines and the scanning wiring lines intersect each other, and on the base material, auxiliary capacity electrodes, which are provided on a pixel basis, are made of transparent electrodes, and generate an auxiliary capacity, and auxiliary capacity wiring lines, which are connected to the auxiliary capacity electrodes and are made of an aluminum alloy, are provided.

Specifically, the scanning wiring lines may be provided above the data wiring lines, or the auxiliary capacity wiring lines may be provided in a layer different from that of the light-shielding blocks and the scanning wiring lines, and each of the auxiliary capacity wiring lines may be provided so as to pass through a substantially center portion of two adjacent scanning wiring lines. Further, the light-shielding blocks may be made of an organic compound such as synthetic resin, and the light-shielding blocks configured in a straight line shape may be provided in a layer different from that of the scanning wiring lines and the auxiliary capacity wiring lines.

Further, in the case of using the light-shielding blocks in a straight line shape as described above, unlike each embodiment, the widened portions may not be formed in the source wiring lines, and light leakage from between two adjacent pixels P can be prevented only by the light-shielding blocks.

Further, in the above-mentioned description, the case has been described where, in the source wiring lines (data wiring lines), widened portions are formed so as to cover a separation region not connected between the gate wiring lines (scanning wiring lines) and end portions of the light-shielding blocks and a separation region not connected between the auxiliary capacity wiring lines and end portions of the light-shielding blocks. However, the display device of the present invention is not limited thereto, and for example, the width may be partially increased in a back matrix so as to cover each separation region.

INDUSTRIAL APPLICABILITY

The present invention is useful for an active matrix substrate in which power consumption can be reduced, and a frame can be narrowed down and an opening ratio can be increased, and a display device using the active matrix substrate.

DESCRIPTION OF REFERENCE NUMERALS

1 liquid crystal display device (display device)
2 liquid crystal panel (display portion)
5 active matrix substrate
5a base material
25 thin film transistor (switching element)
26 pixel electrode
28 auxiliary capacity electrode
28a connecting portion
28' transparent electrode
29 auxiliary capacity wiring line
29a connecting portion
S1-SM, S source wiring line (data wiring line)
G1-GN, G gate wiring line (scanning wiring line)
P pixel

The invention claimed is:

1. An active matrix substrate, comprising:
a base material provided with a data wiring line and a scanning wiring line;
a common electrode;
a pixel provided with a switching element connected to the data wiring line and the scanning wiring line; and
an auxiliary capacitor implemented with an auxiliary capacity electrode and a pixel electrode, which are made of transparent metal oxide conductive material, wherein the auxiliary capacity electrode is in direct contact with an auxiliary capacity wiring line, which is made of an aluminum alloy.

2. The active matrix substrate according to claim 1, wherein the auxiliary capacity wiring line includes a connecting portion, which is provided on a connecting portion of the auxiliary capacity electrode, wherein the connecting portions of the auxiliary capacity electrode and the auxiliary capacity wiring line are in direct contact to each other.

3. The active matrix substrate according to claim 2, wherein the aluminum alloy of the auxiliary capacity wiring line contains, as an additive, at least one element of silicon, cobalt, nickel, germanium, rhodium, palladium, and tin.

4. The active matrix substrate according to claim 3, wherein a total % by weight of the additive is 0.6% to 5.0% in the auxiliary capacity wiring line.

5. The active matrix substrate according to claim 3, wherein the scanning wiring line is made of the same aluminum alloy as the auxiliary capacity wiring line.

6. The active matrix substrate according to claim 3, further comprising a light shielding block, which is made of the same aluminum alloy as the auxiliary capacity wiring line.

7. The active matrix substrate according to claim 3, wherein a sheet resistance of the aluminum alloy ranges from 0.1 Ω/sq to 0.4 Ω/sq.

8. The active matrix substrate according to claim 2, wherein the transparent conductive metal oxide material is at least one of Indium-Tin-Oxide (ITO), Indium-Zinc-Oxide (IZO) and indium-Germanium-Oxide (IGO).

9. The active matrix substrate according to claim 1, wherein, on the base material, the auxiliary capacity electrodes are provided on the auxiliary capacity wiring lines to be connected thereto in connecting portions between the auxiliary capacity electrodes and the auxiliary capacity wiring lines.

10. The active matrix substrate according to claim 9, wherein a transparent conductive film is used as the auxiliary capacity electrodes, and the auxiliary capacity wiring lines contain, as an additive, at least one element of carbon, silicon, cobalt, nickel, germanium, rhodium, palladium, and tin.

11. The active matrix substrate according to claim 10, wherein a total % by weight of the additive is 0.3% to 5.0% in the auxiliary capacity wiring lines.

12. A display device comprising a display portion, wherein, in the display portion, the active matrix substrate according to claim 1 is used.

* * * * *